United States Patent
Whitehead et al.

(10) Patent No.: US 8,156,422 B2
(45) Date of Patent: *Apr. 10, 2012

(54) METHOD AND APPARATUS FOR IMPORTING DATA FROM AN APPLICATION INTO A SECOND APPLICATION

(75) Inventors: Carrie Whitehead, Mountain View, CA (US); Emily W. Hebard, San Francisco, CA (US); Lisa D Holzhauser, San Carlos, CA (US)

(73) Assignee: Intuit Inc., Mountain View, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 11/832,229

(22) Filed: Aug. 1, 2007

(65) Prior Publication Data

US 2008/0270950 A1 Oct. 30, 2008

Related U.S. Application Data

(63) Continuation-in-part of application No. 11/799,236, filed on Apr. 30, 2007, now Pat. No. 7,913,173.

(51) Int. Cl.
*G06F 3/048* (2006.01)

(52) U.S. Cl. .................. 715/233; 715/860; 715/211

(58) Field of Classification Search .................. 715/233, 715/860, 211
See application file for complete search history.

(56) References Cited

U.S. PATENT DOCUMENTS

| | | | |
|---|---|---|---|
| 6,342,906 B1 * | 1/2002 | Kumar et al. ................. 715/751 |
| 7,065,713 B1 * | 6/2006 | Dutta et al. ................. 715/768 |
| 7,343,559 B1 * | 3/2008 | Fujita et al. ................. 715/733 |

* cited by examiner

*Primary Examiner* — Namitha Pillai
(74) *Attorney, Agent, or Firm* — Park, Vaughan, Fleming & Dowler LLP

(57) ABSTRACT

One embodiment of the present invention provides a system that automatically acquires data from an application and imports the data into a second application. During operation, the system receives at a data-acquisition tool a command from a user to acquire data from the application. In response to the command, the system overlays a semi-transparent layer over at least a portion of a display which is generated by the application, so that the data within the display is still visible to the user. Next, the system receives a drawing command from the user to draw a shape around an item of data within the display. In response to the drawing command, the system draws a shape around the item of data within the display, wherein the shape is drawn on the semi-transparent layer. The system then acquires the item of data bounded by the shape.

42 Claims, 5 Drawing Sheets

| TEMPORARY TABLE 208 | |
|---|---|
| FIELD | VALUE |
| PAYEE | SKI BARN |
| AMOUNT | $205.09 |
| . . . | . . . |

WEB BROWSER 202

TRACING LAYER 204

| QTY. | DESCRIPTION | COST |
|---|---|---|
| 1 | Women's Jacket, Red, Extra Large | $49.95 |
| 1 | Women's Ski Boots, Red, Size 9 | $139.95 |
| | Subtotal | $189.90 |
| | Tax | $15.19 |
| | Total | $205.09 |

Shape 206

FIG. 2

METHOD AND APPARATUS FOR IMPORTING DATA FROM AN APPLICATION INTO A SECOND APPLICATION

RELATED APPLICATION

This application is a continuation-in-part of, and hereby claims priority under 35 U.S.C. §120 to, U.S. patent application Ser. No. 11/799,236, entitled "METHOD AND APPARATUS FOR ACQUIRING DATA PRESENTED WITHIN A WEB BROWSER," by inventors Emily W. Hebard, Lisa D. Holzhauser, and Carrie Whitehead, filed on 30 Apr. 2007, which is herein incorporated by reference.

BACKGROUND

Related Art

Computer users typically use a number of different applications on a daily basis. In many situations, a user may desire to consolidate data from these applications into a single application. Furthermore, the user may desire to transfer data from one organization's version of an application to a competitor's version of the application.

Currently, the user must manually perform this type of data-transfer or consolidation via a keyboard. This key-entry is time consuming, tedious, and error prone. Consequently, some users delay consolidating or transferring their data until they consider it absolutely necessary. However, by this time, a significant amount of data may need to be transferred. This delayed data-transfer or consolidation can lead to additional problems, such as accidentally forgetting to transfer or consolidate some data.

SUMMARY

One embodiment of the present invention provides a system that automatically acquires data from an application and imports the data into a second application. During operation, the system receives at a data-acquisition tool a command from a user to acquire data from the application. In response to the command, the system overlays a semi-transparent layer over at least a portion of a display which is generated by the application, so that the data within the display is still visible to the user. Next, the system receives a drawing command from the user to draw a shape around an item of data within the display. In response to the drawing command, the system draws a shape around the item of data within the display, wherein the shape is drawn on the semi-transparent layer. The system then acquires the item of data bounded by the shape.

In some embodiments of the present invention, the data-acquisition tool executes independently from the second application.

In some embodiments of the present invention, the data-acquisition tool is associated with the second application.

In some embodiments of the present invention, the data-acquisition tool, the application, and the second application are located on different devices.

In some embodiments of the present invention, acquiring the item of data can involve communicating with the application via an exposed interface, whereby third-party applications can communicate with the application.

In some embodiments of the present invention, acquiring the item of data can involve using built-in tools provided by the application to communicate with the application.

In some embodiments of the present invention, acquiring the item of data can involve creating a screen shot of the display. The system then performs an optical character recognition (OCR) process on the screen shot.

In some embodiments of the present invention, the system makes the item of data available to the second application. Then, the system imports the item of data into the second application.

In some embodiments of the present invention, the system imports the item of data into the second application without executing the second application. This is accomplished by modifying a file which is accessed by the second application.

In some embodiments of the present invention, the system imports the item of data into a third-party application.

In some embodiments of the present invention, acquiring the item of data can involve associating the item of data with a tag. The system can obtain the tag from: the user; metadata which is associated with the item of data; the application; the second application; and a template.

In some embodiments of the present invention, the system imports the item of data into the second application based on the tag.

In some embodiments of the present invention, drawing the shape around the item of data involves drawing the shape around a portion of the item of data.

In some embodiments of the present invention, the system additionally identifies the item of data based on information contained in the portion of the item of data.

BRIEF DESCRIPTION OF THE FIGURES

FIG. 2 illustrates a data-acquisition process in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Computing Environment

Figure 1:
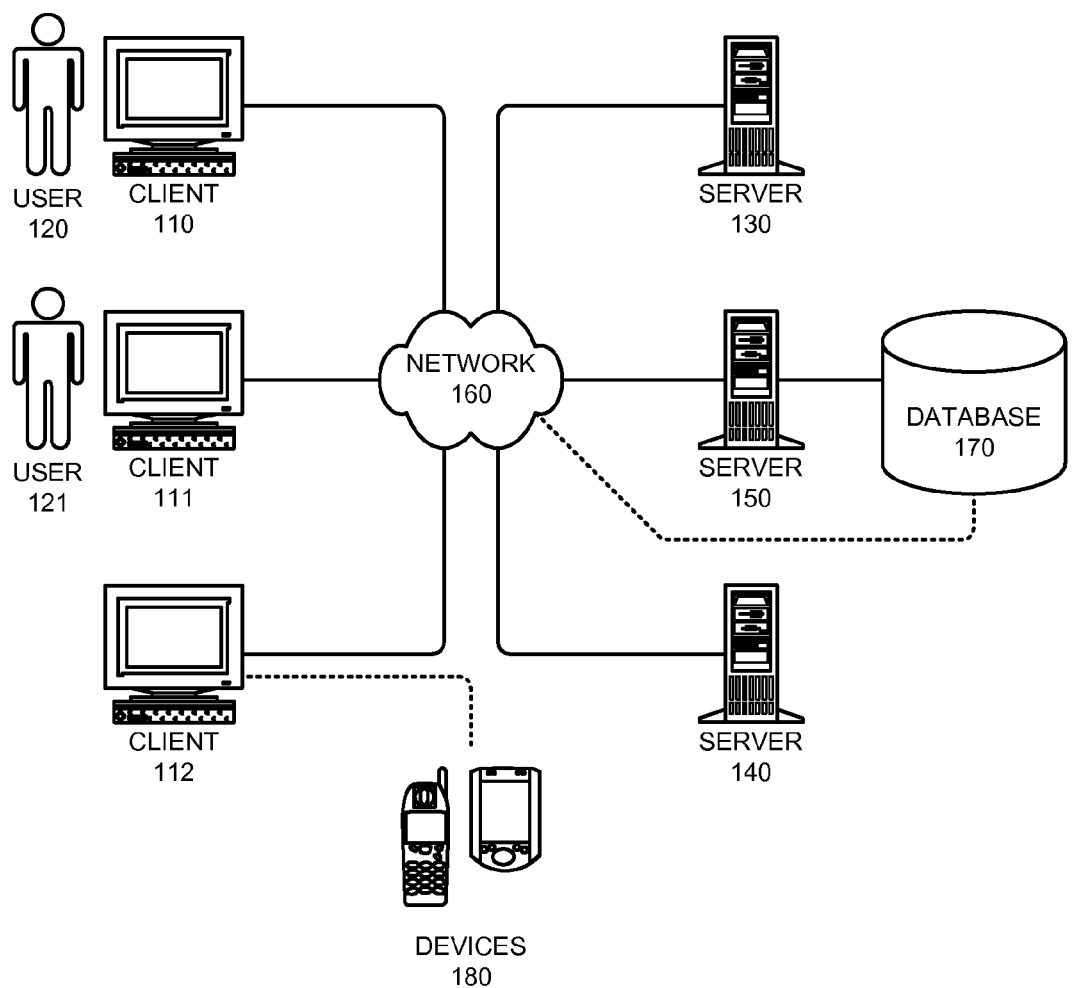
FIG. 1 illustrates a computing environment in accordance with an embodiment of the present invention.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes clients 110-112, users 120 and 121, server 130, server 140, server 150, network 160, database 170, and devices 180.

Clients 110-112 can generally include any node on a network including computational capability and including a mechanism for communicating across the network.

Servers 130-150 can generally include any system capable of hosting and/or running a service that is accessible from network 160. Furthermore, servers 130-150 can generally include any nodes on a computer network including a mechanism for servicing requests from a client for computational and/or data storage resources.

Users 120 and 121 can generally include: an individual; a group of individuals; an organization; a group of organizations; a computing system; a group of computing systems; or any other entity that can interact with computing environment 100.

Network 160 can generally include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as mp3 players), gaming systems, digital cameras, portable storage mediums, or any other device that can be coupled to the client. Note that in some embodiments of the present invention, devices 180 can couple directly to network 160 and can function in the same manner as clients 110-112.

Data Acquisition

FIG. 2 illustrates a data-acquisition process in accordance with an embodiment of the present invention. In one embodiment of the present invention, user 120 uses web browser 202 on client 110 to purchase goods from an online vendor. Upon being presented with financial data, such as an itemized receipt, user 120 invokes the data-acquisition tool which overlays a tracing layer 204 on top of the financial data presented in web browser 202. Note that web browser 202 may be opened within user 120's financial management application, or may be opened as a stand-alone browser.

Once tracing layer 204 is active, user 120 manipulates a drawing tool to circle all of the items of data that user 120 wants to enter into user 120's financial management application. For example, as illustrated in FIG. 2, user 120 has encircled the transaction total with shape 206. User 120 then drags shape 206 to temporary table 208. Note that in some embodiments of the present invention, upon creating shape 206, data encircled by shape 206 is automatically populated to temporary table 208.

In some embodiments of the present invention, the values in the "field" column of temporary table 208 are automatically populated from user 120's financial management software, while in other embodiments of the present invention, user 120 drags the fields to temporary table 208 from the financial management software.

Upon completing the data acquisition operations, user 120 closes tracing layer 204. In some embodiments of the present invention, user 120 is presented with the option of saving the tracing layer shapes from tracing layer 204, the field mappings in temporary table 208, or both as a template for future data acquisition from the same web site.

In some embodiments of the present invention, templates are saved on client 110 to facilitate subsequent data acquisition by user 120 from the same web site. User 120 may also share the template with other users, such as user 121, to facilitate data acquisition from the same web site. Note that user 121 may use the template even if user 121 uses different financial management software, because the data that has already been mapped to temporary table 208 can be easily remapped to fields within user 121's financial management software without having to re-encircle the data.

In some embodiments of the present invention, user 120 sends the template to a template collection or a template database, such as database 170. Likewise, when acquiring data from a web page that user 120 has never acquired data from in the past, user 120 may contact database 170 to search for an existing template. In some embodiments of the present invention, the template may be linked to and acquired as a download from the web page that user 120 is acquiring the data from. Furthermore, in some embodiments of the present invention, the template may be included with user 120's financial management software.

Process of Data Acquisition

Figure 3:
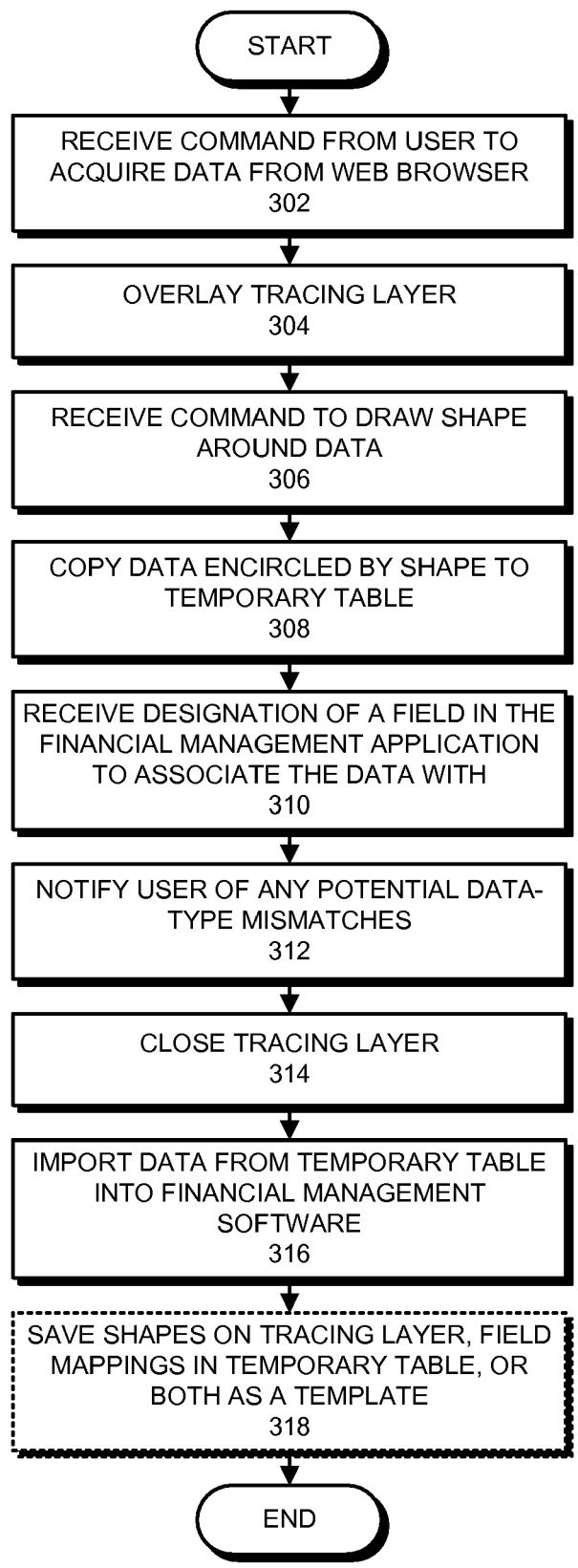
FIG. 3 presents a flow chart illustrating the process of acquiring data in accordance with an embodiment of the present invention.

FIG. 3 presents a flow chart illustrating the process of acquiring data in accordance with an embodiment of the present invention. During operation, the system receives a command from user 120 to acquire data from web browser 202 (operation 302). In response to the command, the system overlays tracing layer 204 over the data in web browser 202 (operation 304). Note that tracing layer 204 may be semi-translucent so that the data is still visible through tracing layer 204. In some embodiments of the present invention, tracing layer 204 may be virtually transparent, while in other embodiments of the present invention, tracing layer 204 may be close to opaque. In some embodiments of the present invention, the level of transparency of tracing layer 204 is configurable by user 120.

Once tracing layer 204 is overlaid on the data, the system receives a drawing command from user 120 who draws a shape around an item of data (operation 306). The system then copies the data encircled by the shape to temporary table 208 (operation 308). The system also receives a designation of a field in the financial management application to associate the data with (operation 310). In some embodiments of the present invention, this can involve dragging the data to the field within the financial management application, while in other embodiments of the present invention, the system can attempt to automatically map the fields. In some embodiments of the present invention, the system may utilize field names or meta tags within the data to attempt to automatically map the fields. Note that in some embodiments of the present invention, user 120 may edit the data in temporary table 208.

In some embodiments of the present invention, the system notifies user 120 of potential data-type mismatches (operation 312), such as if user 120 attempts to map a currency value to a date field. Once the mappings have been completed, the system closes tracing layer 204 (operation 314) and imports the data from temporary table 208 into the financial management software (operation 316).

In some embodiments of the present invention, the system saves the shapes on tracing layer 204, the field mappings in temporary table 208, or both as a template for subsequent data acquisition (operation 318). Note that this can involve saving the template locally, on client 110, as well as saving the template to a template repository, such as database 170.

In some embodiments of the present invention, acquiring the text encircled by shape 206 involves analyzing the code that is displayed in the web browser, such as the HyperText Markup Language (HTML) code or the eXtensible Markup Language (XML) code, and finding the text that is displayed within shape 206. In other embodiments of the present invention, the system performs an Optical Character Recognition (OCR) operation on a bitmap representing the area encircled by shape 206.

In some embodiments of the present invention, the system acquires data from sources other than web browser 202. For example, in one embodiment of the present invention, the system overlays tracing layer 204 on top of an application running on client 110, while in another embodiment of the present invention, the system overlays tracing layer 204 on top of a scanned document. In some embodiments of the present invention, the system can acquire data from any source that can be displayed on client 110. This can include: data that that resides on client 110, data stored on a storage medium coupled to client 110, data hosted by a device or computer system coupled to client 110, (either directly or via network 160), or any other source for storing or hosting data accessible to client 110.

Client

Figure 4:
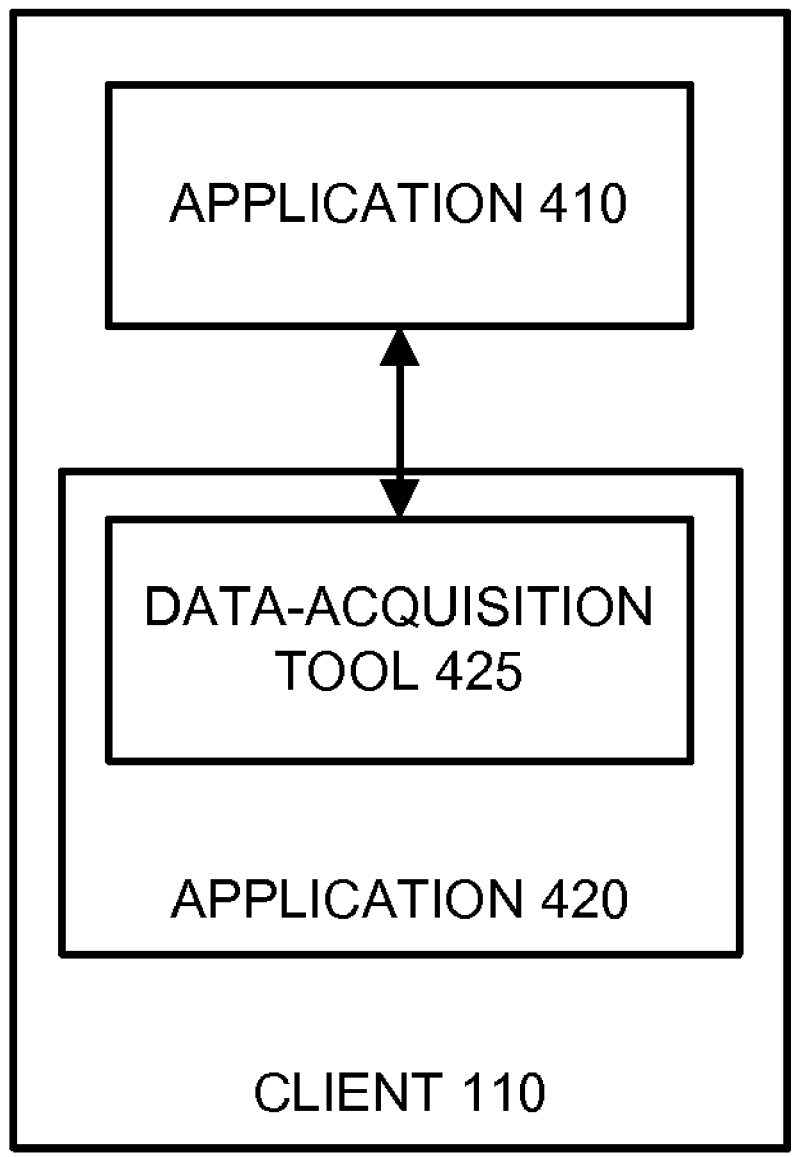
FIG. 4 illustrates a client in accordance with an embodiment of the present invention.

FIG. 4 illustrates a client 110 in accordance with an embodiment of the present invention. Client 110 can host: application 410; application 420; and data-acquisition tool 425.

In some embodiments of the present invention, client 110 can be a server or any other type of computing system.

In some embodiments of the present invention, different computing systems can host application 410 and application 420. For example, client 110 can host application 410, and server 130 can host application 420.

Application 410 and application 420 can generally include any type of application that a client or a server can host. Note that application 420 includes data-acquisition tool 425.

In some embodiments of the present invention, data-acquisition tool 425 can be a stand-alone tool. In these embodiments, different computing systems can host application 410, application 420, and data-acquisition tool 425. For example, client 110 can host application 410, client 111 can host application 420, and server 140 can host data-acquisition tool 425.

Data-acquisition tool 425 can generally include any tool that can acquire data from application 410. Furthermore, data-acquisition tool 425 can generally include any tool that can import acquired data into application 420.

In some embodiments of the present invention, data-acquisition tool 425 can execute independently from application 420. In these embodiments, data-acquisition tool 425 may or may not be associated with application 420.

Acquiring Data from an Application

Figure 5:
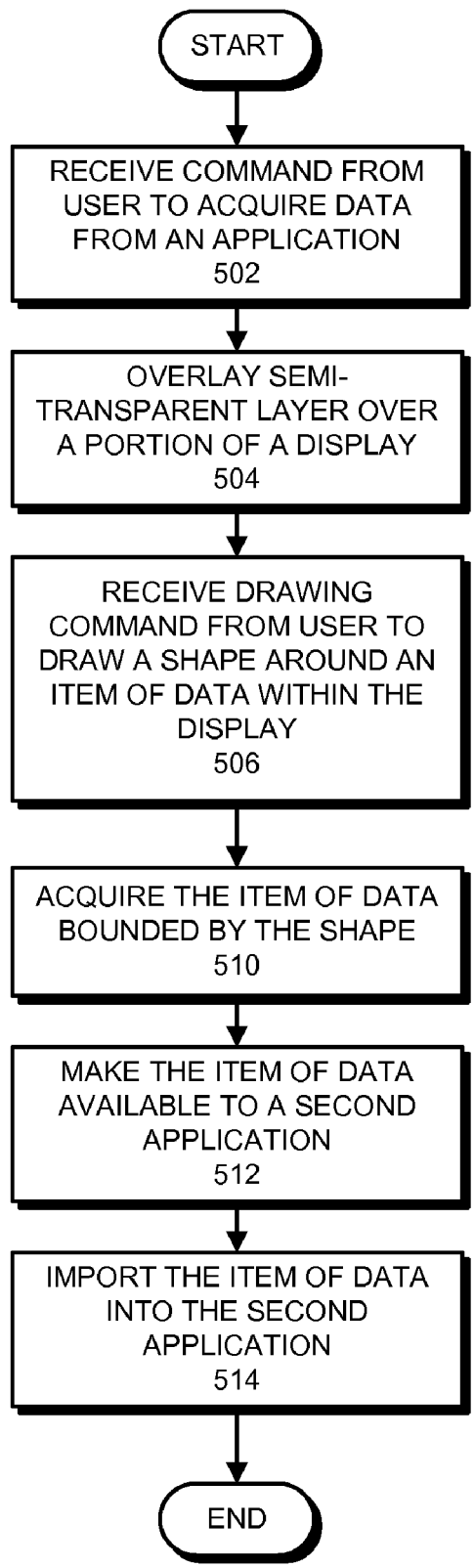
FIG. 5 presents a flow chart illustrating the process of acquiring data from an application in accordance with an embodiment of the present invention.

FIG. 5 presents a flow chart illustrating the process of acquiring data from an application 410 in accordance with an embodiment of the present invention. The process begins when data-acquisition tool 425 receives a command from a user, such as user 120, to acquire data from application 410 (operation 502). In response to the command, data acquisition-tool 425 overlays a semi-transparent layer over at least a portion of a display which is generated by application 410 (operation 504). Note that data within the covered portion of the display remains visible to user 120. Next, data-acquisition tool 425 receives a drawing command from user 120. This drawing command instructs data-acquisition tool 425 to draw a shape around an item of data (or multiple items of data) within the covered portion of the display (operation 506). In response to receiving the drawing command, data acquisition tool 425 draws a shape around the item of data within the display. Note that data acquisition tool 425 draws the shape on the semi-transparent layer.

In some embodiments of the present invention, user 120 can select the drawing command from: a tool-bar; a menu-bar; an options panel; or any other command-selection system.

In some embodiments of the present invention, user 120 can select the drawing command by: clicking a mouse button; pressing and holding a mouse button; double clicking a mouse button; or any other method for selecting a drawing command from an input device.

In some embodiments of the present invention, user 120 instructs data-acquisition tool 425 to draw the shape around the item of data by pressing and holding a button from an input device, and encircling the item of data with a cursor associated with a digital pen or pencil.

In some embodiments of the present invention, user 120 instructs data-acquisition tool 425 to draw the shape around the item of data by clicking or double-clicking an input device while a cursor is hovering over the item of data.

In some embodiments of the present invention, drawing the shape around the item of data involves drawing the shape around a portion of the item of data. Note that the drawing command may or may not instruct data-acquisition tool 425 to draw the shape only around the portion of the item of data. For example, the drawing command may select a particular item of data. However, a portion of the particular item of data may be copy-protected. Thus, data-acquisition tool 425 may only select the non-copy-protected portion of the particular item of data.

Data-acquisition tool 425 then acquires the item of data bounded by the shape (operation 510).

In some embodiments of the present invention, acquiring the item of data can involve identifying the item of data based on the portion of the item of data encircled by the shape.

In some embodiments of the present invention, acquiring the item of data can involve communicating with application 410 via an exposed interface, such as an Application Programmer Interface (API), which enables third-party applications to communicate with application 410. Note that these embodiments enable data-acquisition tool 425 to optimally communicate with application 410.

In some embodiments of the present invention, acquiring the item of data can involve using built-in tools, such as a copy tool and a paste tool, provided by application 410 to communicate with application 410.

In some embodiments of the present invention, acquiring the item of data can involve creating a screen shot of the display. Data-acquisition tool 425 can then perform an optical character recognition (OCR) process on the screen shot to obtain the item of data.

In some embodiments of the present invention, acquiring the item of data can involve associating the item of data with a tag. Data-acquisition tool 425 can obtain this tag from: user 120; an existing tag associated with the item of data; metadata which is associated with the item of data; application 410; metadata associated with application 410; application 420; metadata associated with application 420; a template; and any other tagging or classification system.

Next, data-acquisition tool 425 makes the item of data available to application 420 (operation 512). This may involve: converting the item of data from an existing format to a format associated with application 420; enabling application 420 to access the item of data; granting application 420 permission to access the item of data; informing application 420 that the item of data is available to access; or any other process that facilitates application 420 accessing the item of data. Note that in some embodiments of the present invention, making the item of data available to application 420 requires no further operations. Data-acquisition tool 425 then imports the item of data into application 420 (operation 514).

In some embodiments of the present invention, data-acquisition tool 425 can import the item of data without executing application 420. For example, data-acquisition tool 425 can modify a file associated with application 420.

In some embodiments of the present invention, importing the item of data can involve importing the item of data into a third-party application. Note that either client 110 or a third-party device can host the third-party application.

In some embodiments of the present invention, data-acquisition tool 425 can decide to import the item of data into application 420 based on the type of tag which is associated with the item of data. For example, if a sales tag is associated with the item of data, data acquisition tool 425 can import the item of data into a sales screen or sales file associated with application 420.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for importing data, which is presented visually to a user within an application, into a second application, the method comprising:
  receiving at a data acquisition tool on a computer a command from the user to import data from the application to the second application;
  in response to the command, overlaying a semi-transparent layer over at least a portion of a display which is generated by the application, wherein the portion of the display that is covered by the semi-transparent layer remains visible to the user;
  after overlaying the semi-transparent layer:
    receiving a drawing command from the user to select an item of data by drawing a shape around the item of data displayed by the application, wherein the item of data includes a visually presented data value, and wherein non-selected data content within the application remains visible to the user after the item of data is selected; and
    in response to the drawing command, drawing a shape around the data item on the semi-transparent layer;
  importing the item of data, which is encircled by the boundary of the shape, to the second application by:
    populating the visually presented data value as presented to the user by the application to a temporary table associated with the second application, and
    mapping the visually presented data value to a field within the second application, wherein a row in the temporary table includes the visually presented data value as presented to the user by the application and a name of the mapped field.

2. The method of claim 1, wherein the data acquisition tool executes independently from the second application.

3. The method of claim 1, wherein the data acquisition tool is associated with the second application.

4. The method of claim 1, wherein the data acquisition tool, the application, and the second application are located on different devices.

5. The method of claim 1, wherein acquiring the data item can involve communicating with the application via an exposed interface, whereby third-party applications can communicate with the application.

6. The method of claim 1, wherein acquiring the data item can involve using built-in tools provided by the application to communicate with the application.

7. The method of claim 1, wherein acquiring the data item can involve:
  creating a screen shot of the display; and
  performing an optical character recognition (OCR) process on the screen shot.

8. The method of claim 1, further comprising:
  making the data item available to the second application; and
  importing the data item into the second application.

9. The method of claim 1, further comprising importing the data item into the second application without executing the second application by modifying a file which is accessed by the second application.

10. The method of claim 1, further comprising importing the data item into a third-party application.

11. The method of claim 1, wherein acquiring the data item can involve associating the data item with a tag, and wherein the tag can be obtained from:
  the user;
  metadata which is associated with the item of data;
  the application;
  the second application; and
  a template.

12. The method of claim 11, further comprising importing the data item into the second application based on the tag.

13. The method of claim 1, wherein drawing the shape around the item of data involves drawing the shape around a portion of the data item.

14. The method of claim 13, further comprising identifying the data item based on information contained in the portion of the data item.

15. A computer-readable storage medium storing instructions that when executed by a computer cause the computer to perform a method for importing data, which is presented visually to a user within an application, into a second application, the method comprising:
  receiving at a data acquisition tool a command from the user to import data from the application to the second application;
  in response to the command, overlaying a semi-transparent layer over at least a portion of a display which is generated by the application, wherein the portion of the display that is covered by the semi-transparent layer remains visible to the user;

after overlaying the semi-transparent layer:
receiving a drawing command from the user to select an item of data by drawing a shape around the item of data displayed by the application, wherein the item of data includes a visually presented data value, and wherein non-selected data content within the application remains visible to the user after the item of data is selected; and
in response to the drawing command, drawing a shape around the data item on the semi-transparent layer;
importing the item of data, which is encircled by the boundary of the shape, to the second application by:
populating the visually presented data value as presented to the user by the application to a temporary table associated with the second application, and
mapping the visually presented data value to a field within the second application, wherein a row in the temporary table includes the visually presented data value as presented to the user by the application and a name of the mapped field.

16. The computer-readable storage medium of claim 15, wherein the data acquisition tool executes independently from the second application.

17. The computer-readable storage medium of claim 15, wherein the data acquisition tool is associated with the second application.

18. The computer-readable storage medium of claim 15, wherein the data acquisition tool, the application, and the second application are located on different devices.

19. The computer-readable storage medium of claim 15, wherein acquiring the data item can involve communicating with the application via an exposed interface, whereby third-party applications can communicate with the application.

20. The computer-readable storage medium of claim 15, wherein acquiring the data item can involve using built-in tools provided by the application to communicate with the application.

21. The computer-readable storage medium of claim 15, wherein acquiring the data item can involve:
creating a screen shot of the display; and
performing an optical character recognition (OCR) process on the screen shot.

22. The computer-readable storage medium of claim 15, wherein the method further comprises:
making the data item available to the second application; and
importing the data item into the second application.

23. The computer-readable storage medium of claim 15, wherein the method further comprises importing the data item into the second application without executing the second application by modifying a file which is accessed by the second application.

24. The computer-readable storage medium of claim 15, wherein the method further comprises importing the data item into a third-party application.

25. The computer-readable storage medium of claim 15, wherein acquiring the data item can involve associating the data item with a tag, and wherein the tag can be obtained from:
the user;
metadata which is associated with the item of data;
the application;
the second application; and
a template.

26. The computer-readable storage medium of claim 25, wherein the method further comprises importing the data item into the second application based on the tag.

27. The computer-readable storage medium of claim 15, wherein drawing the shape around the data item involves drawing the shape around a portion of the data item.

28. The computer-readable storage medium of claim 27, wherein the method further comprises identifying the data item based on information contained in the portion of the data item.

29. An apparatus that imports data, which is presented visually to a user within an application, into a second application, comprising:
a receiving mechanism configured to receive at a data acquisition tool a command from the user to import data from the application to the second application;
an overlay mechanism configured to overlay a semi-transparent layer over at least a portion of a display which is generated by the application, wherein the portion of the display that is covered by the semi-transparent layer remains visible to the user;
wherein the receiving mechanism is further configured to receive a drawing command from the user to select an item of data by drawing a shape around the item of data displayed by the application, wherein the item of data includes a visually presented data value, and wherein non-selected data content within the application remains visible to the user after the item of data is selected;
a drawing mechanism configured to draw a shape around the data item on the semi-transparent layer after the overlay mechanism overlays the semi-transparent layer;
an acquisition mechanism configured to
import the item of data, which is encircled by the boundary of the shape, to the second application by:
populating the visually presented data value as presented to the user by the application to a temporary table associated with the second application, and
mapping the visually presented data value to a field within the second application, wherein a row in the temporary table includes the visually presented data value as presented to the user by the application and a name of the mapped field.

30. The apparatus of claim 29, wherein the data acquisition tool executes independently from the second application.

31. The apparatus of claim 29, wherein the data acquisition tool is associated with the second application.

32. The apparatus of claim 29, wherein the data acquisition tool, the application, and the second application are located on different devices.

33. The apparatus of claim 29, wherein the acquisition mechanism is further configured to communicate with the application via an exposed interface, whereby third-party applications can communicate with the application.

34. The apparatus of claim 29, wherein the acquisition mechanism is further configured to use built-in tools provided by the application to communicate with the application.

35. The apparatus of claim 29, wherein the acquisition mechanism is further configured to:
create a screen shot of the display; and
perform an optical character recognition (OCR) process on the screen shot.

36. The apparatus of claim 29, further comprising:
an importation mechanism configured to make the data item available to the second application, and to import the data item into the second application.

37. The apparatus of claim 29, further comprising an importation mechanism configured to import the data item into the second application without executing the second application by modifying a file which is accessed by the second application.

38. The apparatus of claim 29, further comprising an importation mechanism configured to import the data item into a third-party application.

39. The apparatus of claim 29, wherein the acquisition mechanism is further configured to associate the data item with a tag, and wherein the tag can be obtained from:
- the user;
- metadata which is associated with the item of data;
- the application;
- the second application; and
- a template.

40. The apparatus of claim 39, further comprising an importation mechanism configured to import the data item into the second application based on the tag.

41. The apparatus of claim 29, wherein the drawing mechanism is further configured to draw the shape around a portion of the data item.

42. The apparatus of claim 41, wherein the acquisition mechanism is further configured to identify the data item based on information contained in the portion of the data item.

* * * * *